R. HUFF.
MOTOR VEHICLE.
APPLICATION FILED NOV. 18, 1910.
1,073,073.
Patented Sept. 9, 1913.
3 SHEETS—SHEET 1.
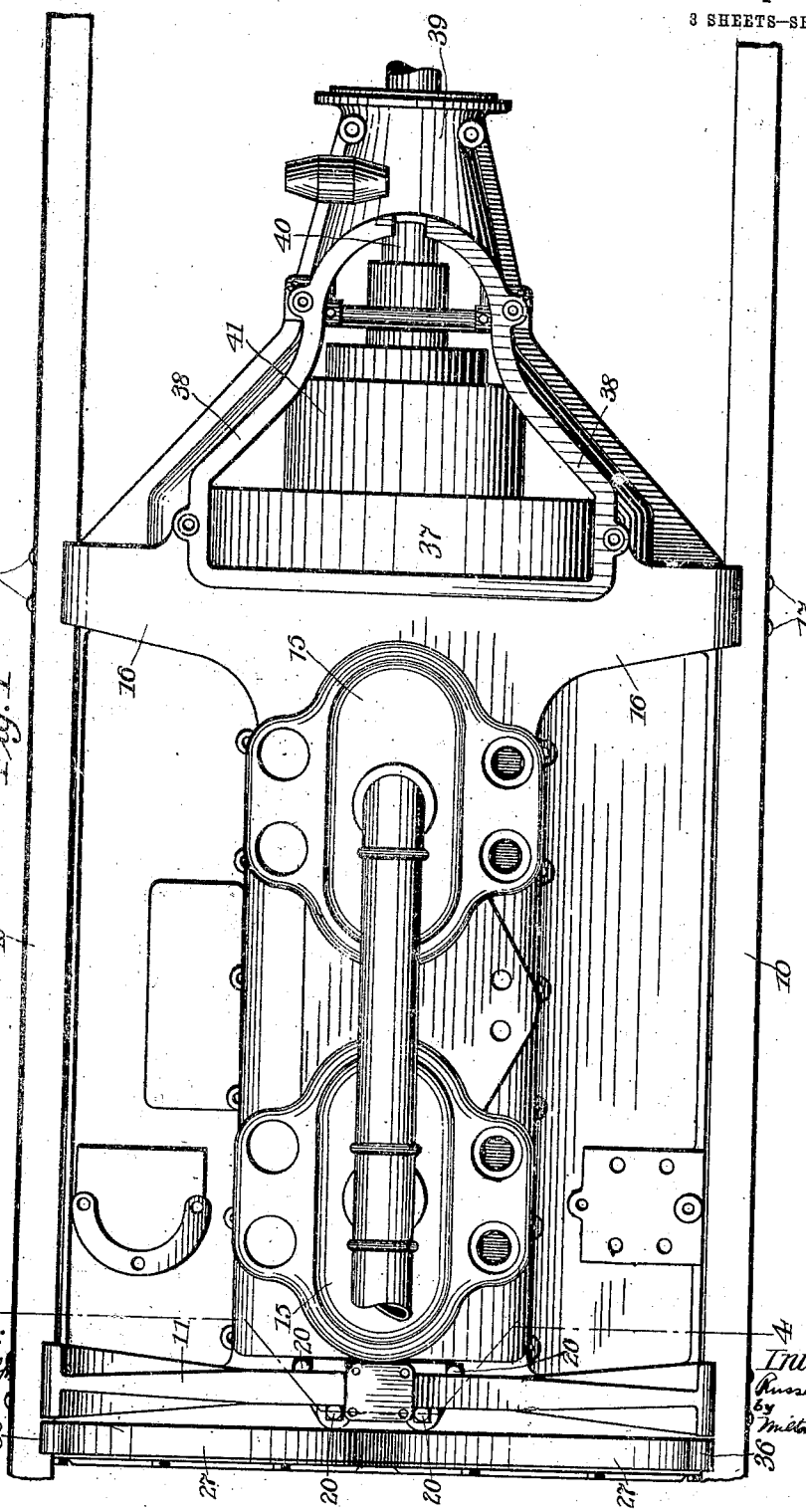

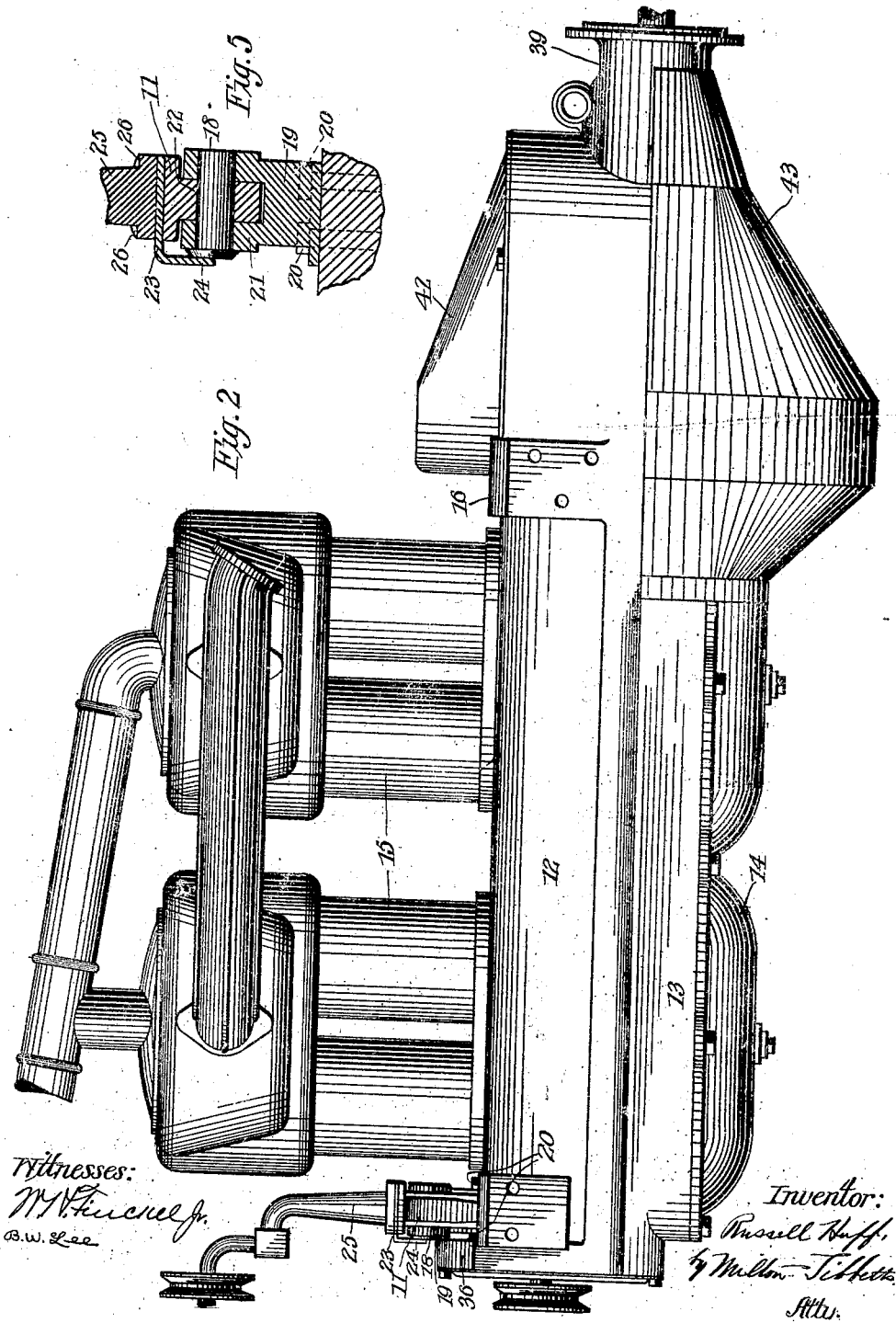

R. HUFF.
MOTOR VEHICLE.
APPLICATION FILED NOV. 18, 1910.
1,073,073.
Patented Sept. 9, 1913.
3 SHEETS—SHEET 3.
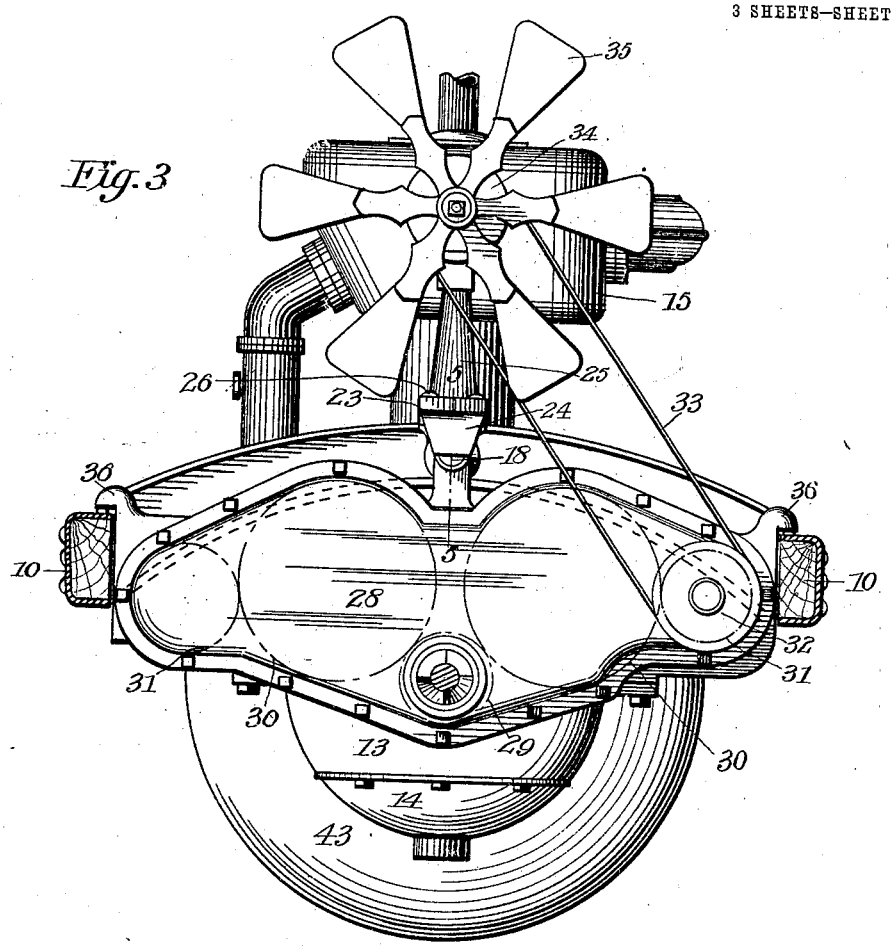
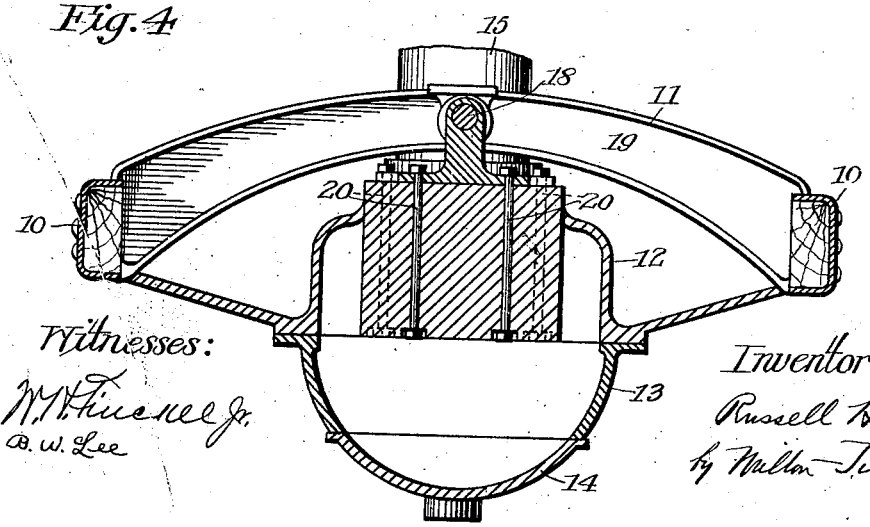

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,073,073.          Specification of Letters Patent.       Patented Sept. 9, 1913.

Application filed November 18, 1910. Serial No. 593,036.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This invention relates to motor vehicles and particularly to the motor and clutch thereof and their means of support on the frame of the vehicle.

One of the objects of the invention is to support the motor and clutch on the vehicle frame rigidly at two points and by a pivotal connection at a third point, the latter point preferably being at the front of the motor, thus permitting a slight warping of the front end of the frame without seriously affecting the alinement of the motor and its crank shaft.

Other objects will appear from the following specification and claims taken in connection with the drawings which form a part of the specification, and in which—

Figure 1 is a plan view of a portion of a vehicle frame with a motor and clutch supported thereon in conformity with the present invention; Fig. 2 is a side elevation of the motor and clutch shown in Fig. 1 with the side members of the frame removed; Fig. 3 is a front view of the motor with the side members of the vehicle frame in section; Fig. 4 is a vertical section approximately on the line 4—4 of Fig. 1 except that the cross beam is shown in full; and Fig. 5 is a fragmentary vertical section on the line 5—5 of Fig. 3.

In the drawings, 10 represents the two side members of the motor vehicle frame and 11 is a cross beam resting on and secured to the side members 10 preferably near the front end thereof.

12 represents the motor base and crank case which also comprises the intermediate member 13 and the bottom cover 14. Upon this crank case are supported the motor cylinders 15 and the other parts of the motor, and this motor support has integral arms 16 extending laterally from a point adjacent the rear of the cylinders 15 to the side members 10 of the frame, upon which latter these arms rest and to which they are rigidly secured as by bolts 17.

The forward end of the support 12 is hung from the middle part of the cross beam 11 by a longitudinal pivot pin 18. This connection is made through a bracket 19 secured to the support 12 by four long bolts 20 extending entirely through the upper part of the support as shown particularly in Fig. 4. The pin 18 passes through the ears 21 of the bracket 19 and through the alined opening 22 in the cross beam 11, the pin being retained in place by a plate 23 secured to the cross beam directly above the opening 22 and having a finger 24 in contact with the head of the pin. Preferably a fan bracket 25 is supported on top of this plate 23 and the cross beam as by bolts 2 passing through a flange on the bracket and through the plate and the cross beam.

The forward end of the motor base or crank case is formed with hollow laterally extending arms 27 forming a gear case having a front cover 28 and housing the gear 29 on the crank shaft, the cam shaft gears 30, and the auxiliary gears 31, one of the latter of which drives a fan pulley 32 connected by a belt 33 with a pulley 34 secured to the fan 35 for drawing air through the radiator as is well known. This gear case formed by the hollow arms 27 is provided at the extremities of the arms with lugs 36 which are positioned slightly above the frame members 10 in the normal position of the parts and so arranged that they will rest upon the said frame members 10 and support the crank case in the event of failure of the pivotal connection, and for the further purpose of temporarily supporting the front end of the crank case in assembling the motor and frame. It will be understood that these lugs 36 are sufficiently above the frame members 10 in the normal position of the motor so that they do not contact with the frame in the usual warping of the latter in the ordinary operation of the vehicle.

The motor fly wheel 37 is mounted on the crank shaft slightly beyond the arms 16, and said arms are provided with preferably integral extensions 38 in the form of a yoke meeting to form a bearing at 39 in which one end of the clutch shaft 40 is supported. The clutch 41, of any suitable design, is mounted on this shaft 40 and the fly wheel 37 so that the clutch also is supported wholly by the motor support or crank case 12. A top cover 42 and a bottom fly wheel cover 43 are properly secured to the support for completely housing in the fly wheel and clutch.

Having thus described my invention, what I claim is:

1. In a motor vehicle, the combination with the side frame members, of a crank case and motor base comprising a support for the motor cylinders and a pair of integral arms adjacent the rear end thereof resting on said frame members, a beam resting on said frame members adjacent the front end of said support, a longitudinal pivotal connection between said support and said beam, and means at the forward end of said support to support the same from said frame in case of failure of said pivotal connection.

2. In a motor vehicle, the combination with the frame comprising side members and a cross beam, of a motor support having a pivotal connection at its forward end with said cross beam and having arms at its rear end resting on said side members, and means adjacent the forward end of said support for supporting the latter from the frame when the pivotal connection is withdrawn or fails.

3. In a motor vehicle, the combination with the frame comprising side members and a cross beam, of a motor support having a pivotal connection at its forward end with said cross beam and having arms at its rear end resting on said side members, and a pair of arms at the forward end of said support adapted to rest upon said side members when the pivotal connection is withdrawn or fails.

4. In a motor vehicle, the combination with the side frame members, of a crank case and motor base comprising a support for the motor cylinders, a pair of arms at one end of said support resting on said frame members, a fly wheel for the motor located beyond said arms, rearward extensions on said arms around said fly wheel and provided with a bearing, a clutch supported in said bearing and in said fly wheel, a beam resting on said frame members adjacent the other end of said support, and a pivotal connection between said beam and said support.

5. In a motor vehicle, the combination with the side frame members, of a crank case and motor base comprising a support for the motor cylinders, a pair of arms at one end of said support resting on said frame members, a fly wheel for the motor located beyond said arms, rearward extensions on said arms around said fly wheel and provided with a bearing, a clutch supported in said bearing and in said fly wheel, a beam resting on said frame members adjacent the other end of said support, and a pivot pin connecting said support to said beam at the middle of the latter.

6. In a motor vehicle, the combination with the side frame members, of a crank case and motor base comprising a support for the motor cylinders, a pair of arms at one end of said support resting on said frame members, a fly wheel for the motor located beyond said arms, rearward extensions on said arms around said fly wheel and provided with a bearing, a clutch supported in said bearing and in said fly wheel, a beam resting on said frame members adjacent the other end of said support, and a pivot pin arranged longitudinally of the motor connecting said beam to said support.

7. In a motor vehicle, the combination with the side frame members and a cross beam resting thereon, of a motor support having a pivotal connection with said cross beam, a fan mounted on said cross beam, a fan pulley driven by the motor, and a belt connection from said fan pulley to said fan for driving the latter.

In testimony whereof I affix my signature in the presence of two witnesses.

RUSSELL HUFF.

Witnesses:
W. H. FINCALL, Jr.,
C. I. DALE.